Sept. 29, 1964  J. C. VAN WARMERDAM  3,151,264
GRID ELECTRODE HAVING PARTICULAR EXPANSION CHARACTERISTICS
Filed March 1, 1961
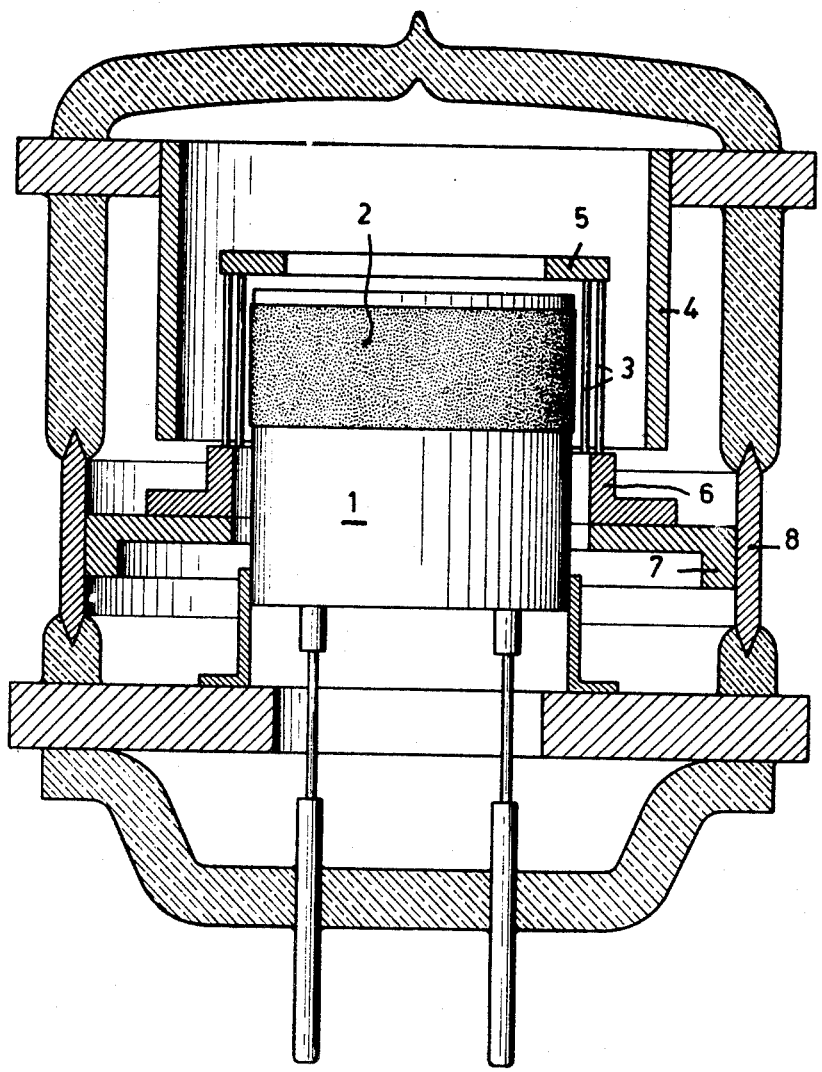
INVENTOR
JOANNES C. VAN WARMERDAM.
BY
AGENT

United States Patent Office 3,151,264
Patented Sept. 29, 1964

3,151,264
GRID ELECTRODE HAVING PARTICULAR
EXPANSION CHARACTERISTICS
Joannes Cornelis van Warmerdam, Eindhoven, Netherlands, assignor to North American Philips Company, Inc., New York, N.Y., a corporation of Delaware
Filed Mar. 1, 1961, Ser. No. 92,629
Claims priority, application Netherlands Mar. 28, 1960
4 Claims. (Cl. 313—311)

The invention relates to an electric discharge tube provided with a cylindrical cathode surrounded by a cage-shaped cylindrical grid, the wires of which are secured, at the free end of the grid, to a metal ring and, at the other end, to a cylindrical support which also acts as a current supply member and dissipates the heat of the grid wires. Such tubes are particularly suited to the production of high frequencies.

In such tubes, in operation undesirable phenomena occur, for example, variations in the tube characteristics and in the transit-time effects.

It has been found that these disadvantages are due to the fact that, when the grid is heated in operation, the grid wires no longer extend parallel to the cathode surface. As a result the grid-cathode spacing is not the same at all points. This disadvantage may be avoided if the ring provided at the free end of the grid is made of a material having a smaller coefficient of expansion than the material of the cylinder supporting the grid.

It has been found that owing to the fact that the heat of the grid is substantially dissipated through the supporting cylinder, the other, free end of the grid is heated to a much higher temperature since usually the ring at this free end of the grid was made from the same material as the supporting cylinder, the ring expanded to a higher extent than the supporting cylinder and the originally cylindrical grid became conical, so that the cathode-grid spacing gradually increased towards the free end of the grid.

This disadvantage occurs in particular in transmitting tubes in which the grids are heated to a high temperature. Even in grids made from copper wires this disadvantage occurs in spite of the better heat dissipation through these wires. The difference in coefficient of expansion between the ring and the supporting cylinder has to be matched to the temperature difference which may be several hundreds of degrees centigrade.

In order that the invention may readily be carried into effect, an embodiment thereof will now be described, by way of example, with reference to the accompanying drawing.

The figure shows a tube according to the invention having a cathode cylinder 1 provided with an emissive layer 2. The emissive layer 2 is surrounded by a cage-shaped grid 3 encircled by an anode 4. The grid 3 consists of copper rods secured at the free end of the grid to a ring 5 made of a suitable iron-nickel alloy, for example fernico, or of molybdenum. At its lower end the grid 3 is supported by a cylinder 6, which may be made of copper and is secured to a nickel disk 7 which is in turn secured to a cylinder 8 made of fernico or ferro-chromium and sealed in the tube wall. The supporting cylinder 6, the disk 7 and the cylinder 8 dissipate the heat from the grid 3. Hence, the ring 5 is heated to a much higher temperature than the supporting cylinder 6. Since the coefficient of expansion of the material of the ring 5 in accordance with the higher temperature is smaller than that of the cylinder 6, the grid 3 remains parallel to the cathode surface 2 even if the temperature of the grid 3 rises during operation.

In order to ensure a satisfactory heat dissipation and a small temperature difference between the ends of the grid, rods 3 are made short so that the diameters of the grid and the cathode must be large in order to enable the required emissive cathode surface to be obtained. For a tube having a power of 6 kw., for example, the diameter of the grid is 65 mms., the length of the grid rods 3 17 mms. and the height of the emissive surface of the cathode 15 mms. The grid comprises 136 wires 3 of a diameter 250 microns.

What is claimed is:

1. An electric discharge tube comprising a cylindrical cathode, a cylindrical cage-shaped grid electrode constituted of a plurality of wires surrounding said cathode, one end of said grid electrode being secured to a cylindrical support, the ends of the wires of said grid electrode remote from the support being secured to an annular metal member having a smaller coefficient of expansion than that of said support.

2. An electric discharge tube comprising a cylindrical cathode, a cylindrical cage-shaped grid electrode constituted of a plurality of wires surrounding said cathode, one end of said grid electrode being secured to a cylindrical copper support, the ends of the wires of said grid electrode remote from said support being secured to an annular molybdenum member.

3. An electron discharge tube comprising a cylindrical cathode, a cylindrical cage-shaped grid electrode constituted of a plurality of wires surrounding said cathode, one end of said grid electrode being secured to a copper support, the ends of the wires remote from the support being secured to an annular nickel-iron alloy member.

4. An electrical discharge tube comprising a cylindrical thermionic cathode, a cylindrical cage-shaped grid electrode constituted of a plurality of wires surrounding said cathode, one end of said grid electrode being secured to a copper support, the ends of the wires remote from the support and in closer proximity to the cathode being secured to an annular member having a smaller coefficient of expansion than that of the support.

References Cited in the file of this patent
UNITED STATES PATENTS
2,277,148    Ronci _____ Mar. 24, 1942